United States Patent
Ubaldi et al.

(10) Patent No.: US 9,843,502 B2
(45) Date of Patent: Dec. 12, 2017

(54) ROUTING OF POINT-TO-MULTIPOINT SERVICES IN A MULTI-DOMAIN NETWORK

(71) Applicant: Telefonaktiebolaget L M Ericsson (publ), Stockholm (SE)

(72) Inventors: Fabio Ubaldi, Pisa (IT); Paola Iovanna, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 14/415,610

(22) PCT Filed: Oct. 9, 2013

(86) PCT No.: PCT/EP2013/071091
§ 371 (c)(1),
(2) Date: Jan. 19, 2015

(87) PCT Pub. No.: WO2015/051839
PCT Pub. Date: Apr. 16, 2015

(65) Prior Publication Data
US 2016/0043934 A1 Feb. 11, 2016

(51) Int. Cl.
*H04L 12/761* (2013.01)
*H04L 12/707* (2013.01)
(Continued)

(52) U.S. Cl.
CPC ............ *H04L 45/16* (2013.01); *H04L 45/02* (2013.01); *H04L 45/22* (2013.01); *H04L 45/28* (2013.01); *H04L 45/42* (2013.01)

(58) Field of Classification Search
None
See application file for complete search history.

(56) References Cited

U.S. PATENT DOCUMENTS

2008/0219272 A1  9/2008  Novello et al.
2011/0019674 A1  1/2011  Iovanna et al.
(Continued)

FOREIGN PATENT DOCUMENTS

| IT | WO 2011103913 A1 * | 9/2011 | ............ H04L 41/12 |
|---|---|---|---|
| WO | 2011103913 A1 | 9/2011 | |
| WO | 2013079225 A1 | 6/2013 | |

OTHER PUBLICATIONS

Zhao, Q., et al., "Extensions to the Path Computation Element Communication Protocol (PCEP) for Point-to-Mutipoint Traffic Engineering Label Switched Paths", Internet Engineering Task Force (IETF), Request for Comments: 6006, Category: Standards Track, Sep. 1, 2010, pp. 1-33, IETF.

(Continued)

*Primary Examiner* — Anh Ngoc Nguyen
(74) *Attorney, Agent, or Firm* — Coats & Bennett, PLLC

(57) ABSTRACT

A multi-domain network (5) has a Hierarchical Path Computation Element, H-PCE, architecture comprising a Parent Path Computation Element, P-PCE (31) and a Child Path Computation Element, C-PCE, (21-25) at each of the domains (11-15). A C-PCE (21-25) determines summarised domain topology information about the domain (11-15). The summarized domain topology information comprises at least one of: an indication of whether the domain (11-15) is capable of supporting Point-to-Multi-Point services; an indication of whether a node of the summarised domain topology is capable of supporting a branch point for Point-to-Multi-Point services. The summarised domain topology information is sent to a P-PCE (31) via a communication interface (35). The P-PCE (31) computes an end-to-end Point-to-Multi-Point tree using a topology based on summarised domain topology information (32) received from the Child Path Computation Elements. The P-PCE (31) requests each C-PCE (21-25) of a domain in the computed end-to-end Point-to-Multi-Point tree to compute an intra-domain path.

22 Claims, 9 Drawing Sheets

(51) Int. Cl.
*H04L 12/751* (2013.01)
*H04L 12/703* (2013.01)
*H04L 12/717* (2013.01)

(56) References Cited

U.S. PATENT DOCUMENTS

2012/0057593 A1* 3/2012 Chen .................. H04L 12/18
370/390
2013/0070638 A1 3/2013 Iovanna et al.

OTHER PUBLICATIONS

Zhao, Q., et al., "PCE-based Computation Procedure to Compute Shortest Constrained P2MP Inter-domain Traffic Engineering Label Switched Paths", PCE Working Group Internet-Draft, May 15, 2013, pp. 1-22, IETF.

Vasseur, J. et al., "A Per-Domain Path Computation Method for Establishing Inter-Domain Traffic Engineering (TE) Label Switched Paths (LSPs)", Network Working Group, Request for Comments: 5152, Category: Standards Track, Feb. 2008, pp. 1-21.

Vasseur, J. et al., "Path Computation Element (PCE) Communication Protocol PCEP)", Network Working Group, Request for Comments: 5440, Category: Standards Track, Mar. 2009, pp. 1-87.

Bradford, R. et al., "Preserving Topology Confidentiality in Inter-Domain Path Computation using a Path-Key-Based Mechanism", Network Working Group, Request for Comments: 5520, Category: Standards Track, Apr. 2009, pp. 1-19.

King, D. et al., "The Application of the Path Computation Element Architecture to the Determination of a Sequence of Domains in MPLS and GMPLS", Internet Engineering Task Force (IETF), Request for Comments: 6805, Category: Informational, ISSN: 2070-1721, Nov. 2012, pp. 1-33.

Gredler, H., et al., "North-Bound Distribution of Link-State and TE Information using BGP", Inter-Domain Routing Internet-Draft Intended status: Standard Track, May 21, 2013, pp. 1-43, Internet Engineering Task Force.

* cited by examiner

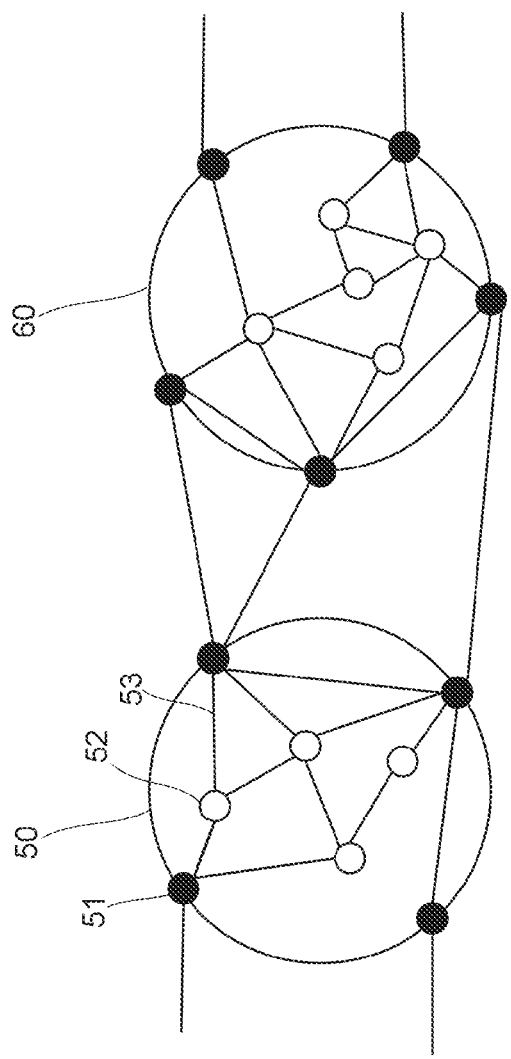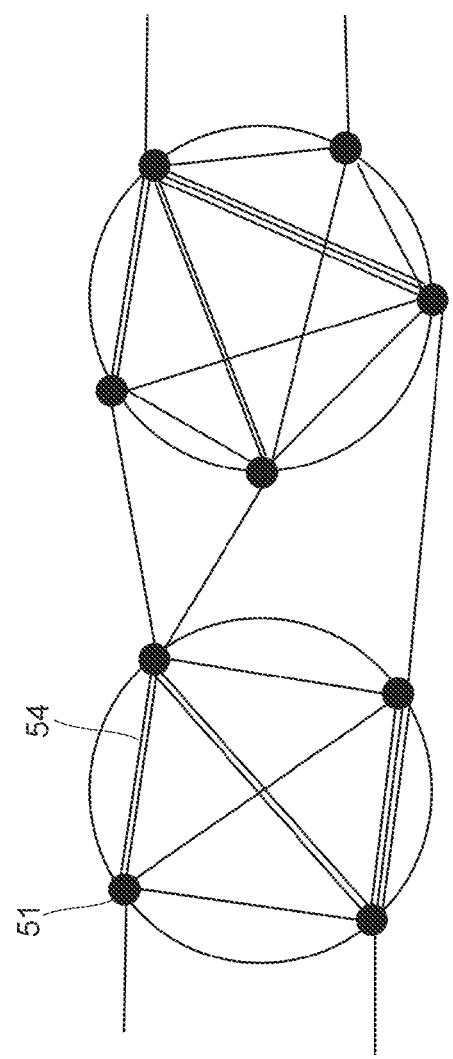

ROUTING OF POINT-TO-MULTIPOINT SERVICES IN A MULTI-DOMAIN NETWORK

TECHNICAL FIELD

This invention relates to routing of point-to-multipoint (P2MP) services in a multi-domain network.

BACKGROUND

With the advent of new network applications and services, end users are demanding high bandwidth end-to-end connections that have to be provisioned automatically and dynamically.

A transport network can comprise multiple network domains. Different carriers or service providers may wish to manage their own parts of the network, thereby creating different network domains. In addition, an operator may wish to divide their network into domains managed independently from each other for reasons such as scalability, geographical position, and multi-vendor interoperability.

The main standardisation bodies, such as Internet Engineering Task Force (IETF), Optical Internetworking Forum (OIF) and International Telecommunications Union (ITU), are addressing aspects of routing in a multi-domain/multi-technology scenario.

One proposal is a "per domain" approach. In this scheme, the entry border node of each domain involved in a path computation requests its domain Path Computation Element (PCE) for a path inside that domain. The resulting end-to-end path is a concatenation of those paths where each domain PCE computes the relative multi-domain segment that crosses the domain itself. This approach is not efficient because the path determined as optimal by a domain may be not optimal for the neighbour.

Another proposal is called Backward Recursive Path Computation (BRPC). This scheme assumes that the PCEs of the domains collaborate to create a Virtual Shortest Path Tree. The Virtual Shortest Path Tree comprises all possible end-to-end paths crossing the sequence domain starting from destination to the source. In this way, the source has the list of all possible end-to-end paths and can select the best according to a specific metric.

Another proposal is called Hierarchical Path Computation Element (H-PCE), described in IETF Request for Comments document 6805 (RFC 6805). Unlike the other approaches, H-PCE does not require a-priori knowledge of the sequence of the domains. H-PCE is based on two levels of PCE that have a hierarchical relationship. A Child Path Computation Element (C-PCE) knows topology information of a domain and is responsible for computing and providing connections inside the domain. A Parent Path Computation Element (P-PCE) is responsible for determining the sequence of domains and coordinates the C-PCEs involved in the end-to-end (E2E) connection.

Most efforts to date have been directed towards routing of Point-to-Point (P2P) services. There is increasing interest in Point-to-Multipoint (P2MP) services, i.e. services with a single source and multiple destination points. With the advent of datacenter and cloud applications, multicast services are increasingly in demand, especially for high-capacity applications such as multicast Virtual Private Networks (VPN) and Internet Protocol Television (IPTV).

The present invention seeks to facilitate routing of Point-to-Multipoint (P2MP) services in a multi-domain network.

SUMMARY

An aspect of the invention provides a method for use in routing Point-to-Multi-Point (P2MP) services in a multi-domain network with a Hierarchical Path Computation Element (H-PCE) architecture. The method comprises, at a Child Path Computation Element (C-PCE) of one of the domains, determining summarised domain topology information about the domain. The summarised domain topology information comprises at least one of: an indication of whether the domain is capable of supporting Point-to-Multi-Point services; and an indication of whether a node of the summarised domain topology is capable of supporting a branch point for Point-to-Multi-Point services. The method further comprises sending the summarised domain topology information to a Parent Path Computation Element (P-PCE).

The method can further comprise determining inter-domain connectivity information which indicates if a node of the domain is connected to a node of another domain. The method can further comprise sending the inter-domain connectivity information to the Parent Path Computation Element.

The step of determining summarised domain topology information about the domain can comprise determining service parameters of the summarised topology of the domain. The method can further comprise sending the service parameters to the Parent Path Computation Element.

The step of sending the summarised domain topology information can use at least one Path Computation Element Protocol message.

The indication of whether the domain is capable of supporting Point-to-Multi-Point services can comprise a Path Computation Element Protocol Type-Length-Value, TLV, Type indicator.

The indication of whether a node of the summarised domain topology is capable of supporting a branch point for Point-to-Multi-Point services can comprise a Branch Node Capability, BNC, object of a Path Computation Element Protocol message.

The method can further comprise receiving a request from the Parent Path Computation Element to compute an intra-domain path and computing an intra-domain path.

Another aspect of the invention provides a method for use in routing Point-to-Multi-Point (P2MP) services in a multi-domain network with a Hierarchical Path Computation Element (H-PCE) architecture. The method comprises, at a Parent Path Computation Element (P-PCE) of the domains, receiving summarised domain topology information from a Child Path Computation Element (C-PCE) of one of the domains. The summarised domain topology information comprises at least one of: an indication of whether the domain is capable of supporting Point-to-Multi-Point services; and an indication of whether a node of the summarised domain topology is capable of supporting a branch point for Point-to-Multi-Point services.

The method can further comprise receiving at least one of: inter-domain connectivity information which indicates if a node of a domain is connected to a node of another domain; and service parameters of the summarised topology of the domain.

The method can further comprise receiving a request to set up a Point-to-Multipoint service between domains. The method can further comprise computing an end-to-end Point-to-Multi-Point tree using a topology based on the summarised domain topology information received from the Child Path Computation Elements, wherein the end-to-end tree comprises a plurality of the domains. The method can further comprise requesting Child Path Computation Elements of domains in the computed end-to-end Point-to-Multi-Point tree to compute an intra-domain path.

The step of requesting can comprise requesting the Child Path Computation Element of a domain in the computed end-to-end tree to perform a branch point for the Point-to-Multipoint tree.

Another aspect of the invention provides a Child Path Computation Element (C-PCE) for a domain of a multi-domain network with a Hierarchical Path Computation Element (H-PCE) architecture. The C-PCE comprises a domain summarisation module arranged to determine summarised topology domain information about the domain. The summarised domain topology information comprises at least one of: an indication of whether the domain is capable of supporting Point-to-Multi-Point, P2MP, services; and an indication of whether a node of the summarised domain topology is capable of supporting a branch point for Point-to-Multi-Point services. The C-PCE comprises an interface for sending the summarised domain topology information to a Parent Path Computation Element (P-PCE).

Another aspect of the invention provides a Parent Path Computation Element (P-PCE) for a domain of a multi-domain network with a Hierarchical Path Computation Element (H-PCE) architecture. The P-PCE comprises an interface for receiving summarised domain topology information from Child Path Computation Elements (C-PCE) of the domains. The summarised domain topology information comprises at least one of: an indication of whether the domain is capable of supporting Point-to-Multi-Point services; and an indication of whether a node of the summarised domain topology is capable of supporting a branch point for Point-to-Multi-Point services. The P-PCE comprises a route computation module arranged to compute an end-to-end Point-to-Multi-Point tree using a topology based on the summarised domain topology information received from the Child Path Computation Elements.

The route computation module can be further arranged to request, via the interface, Child Path Computation Elements of domains in the computed end-to-end Point-to-Multi-Point tree to compute an intra-domain path.

Another aspect of the invention provides a network comprising a plurality of domains. The network further comprises a Hierarchical Path Computation Element (H-PCE) architecture comprising a Parent Path Computation Element (P-PCE) and a Child Path Computation Element (C-PCE) associated with each of the domains.

The P2MP service can be implemented as a connection-oriented technology, such as a Label Switched Path (LSP), a connection-oriented Ethernet path (IEEE 802.1Qay) as some other form of connection-oriented technology.

In another aspect of the present invention there is provided a Child Path Computation Element, C-PCE, for a domain of a multi-domain network with a Hierarchical Path Computation Element, H-PCE, architecture. The C-PCE comprises a processor and a memory, wherein said memory contains instructions executable by said processor whereby said C-PCE is operative to determine summarised topology domain information about the domain, the summarised domain topology information comprising at least one of (i) an indication of whether the domain is capable of supporting Point-to-Multi-Point, P2MP, services or (ii) an indication of whether a node of the summarised domain topology is capable of supporting a branch point for Point-to-Multi-Point services. The C-PCE is further operative to send the summarised domain topology information to a Parent Path Computation Element, P-PCE.

In yet another aspect of the present invention there is provided a Parent Path Computation Element, P-PCE, for a domain of a multi-domain network with a Hierarchical Path Computation Element, H-PCE, architecture. The P-PCE comprises a processor and a memory, wherein said memory contains instructions executable by said processor whereby said P-PCE is operative to receive summarised domain topology information from Child Path Computation Elements, C-PCE, of the domains, wherein the summarised domain topology information comprises at least one of: (i) an indication of whether the domain is capable of supporting Point-to-Multi-Point services or (ii) an indication of whether a node of the summarised domain topology is capable of supporting a branch point for Point-to-Multi-Point services. The P-PCE is further operative to compute an end-to-end Point-to-Multi-Point tree using a topology based on the summarised domain topology information received from the Child Path Computation Elements.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 2A shows two example domain topologies;

FIG. 2B shows summarised versions of the topologies of FIG. 2A;

DETAILED DESCRIPTION

Figure 1:
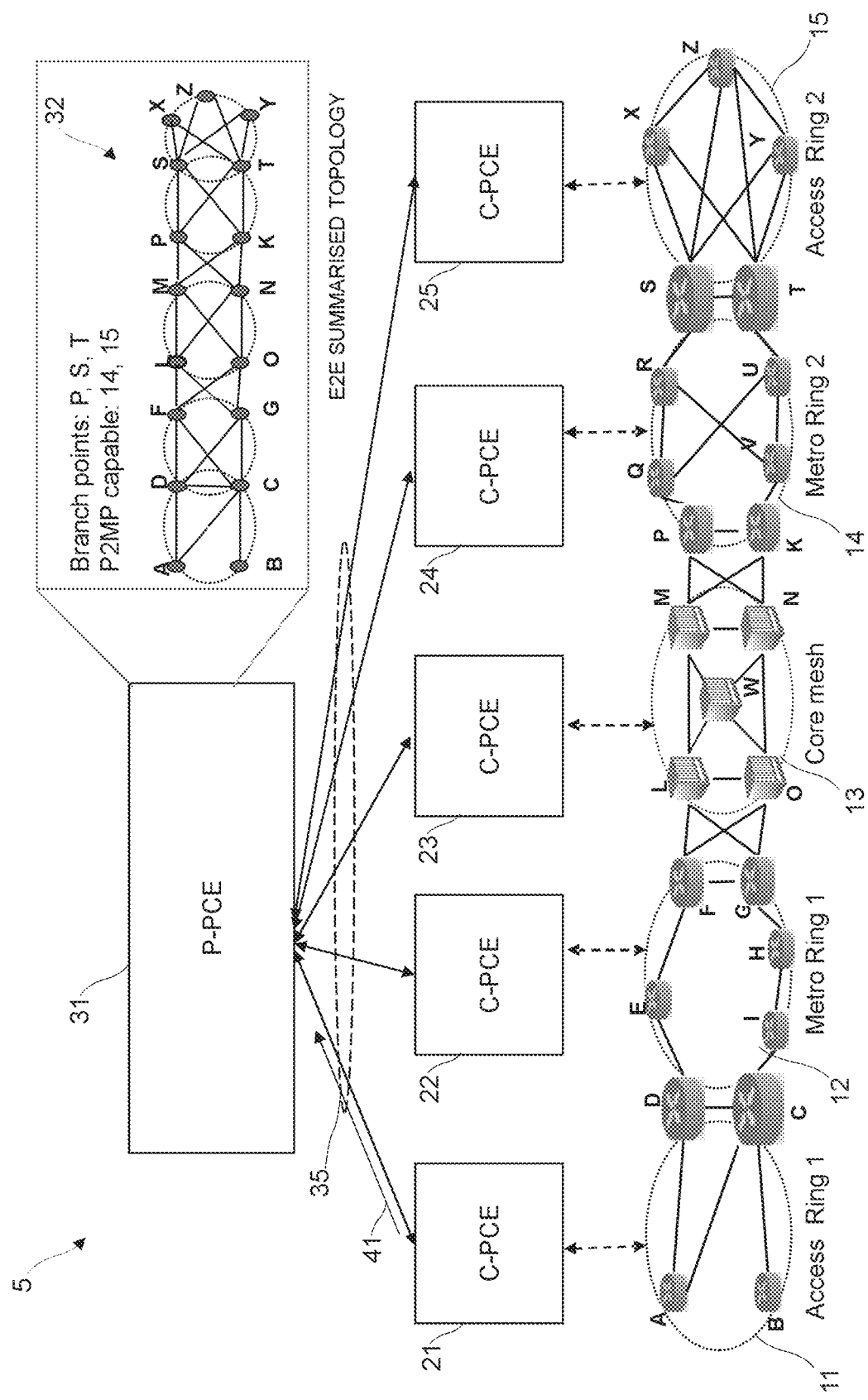
FIG. 1 shows an example of a multi-domain network in which an embodiment of the invention can be applied.

FIG. 1 shows an example of a multi-domain network 5 with five domains 11-15. A domain can also be called an Autonomous System (AS). FIG. 1 shows some example types of domain: an access network domain; a metro network domain; and a core network domain. One or more of the domains may be operated by different network operators or service providers. At least one of the domains may be a multi-layer domain with different transport layers and/or control plane layers. The number of domains can differ from the number shown in this example.

Each domain 11-15 has one or more border nodes which connect to other domains. As an example, domain 11 has border nodes C and D which connect to domain 12. Border nodes can be shared between domains (e.g. nodes C and D shared between domains 11, 12) or dedicated to each domain with communication links connecting to border nodes in other domains (e.g. nodes F, G dedicated to domain 12 and nodes L, O dedicated to domain 13 interconnected by communication links).

The network 5 shown in FIG. 1 has a Hierarchical Path Computation Element (H-PCE) architecture. A Child Path Computation Element (C-PCE) 21-25 is associated with each domain 11-15. A Parent Path Computation Element (P-PCE) 31 is connected to each of the C-PCEs 21-25 by a communication interface 35.

Each of the C-PCEs 21-25 collects topology information about the domain it is associated with. C-PCEs 21-25 can collect this information in any conventional manner, such as by advertisements sent by nodes. Each C-PCE determines a summarised version of the topology information of that domain. Examples of summarisation are explained below. Each of the C-PCEs can share the summarised topology information with the P-PCE 31. Each of the C-PCEs can also compute an intra-domain path within the domain the C-PCE is associated with. Each C-PCE can select what level of summarised topology information to advertise to the P-PCE. In this manner, confidentiality of the intra-domain topology can be maintained.

The P-PCE 31 has a communication interface 35 with each of the C-PCEs 21-25. The P-PCE 31 receives summarised topology information for each of the domains 11-15. Communication over the interface 35 between the P-PCE and the C-PCEs can use the Path Computation Element Communication Protocol (PCEP). The interface 35 can also be used to send requests for path computation between the P-PCE 31 and C-PCEs 21-25.

Each C-PCE also gathers information of inter-domain links connecting the controlled domains (e.g. link attributes, adjacent domain identifier). This information is sent by the C-PCE to the P-PCE via the communication interface 35 (e.g. via PCEP).

The P-PCE 31 forms a summarised topology of the overall multi-domain network 5 based on the summarised topology information received from each C-PCE 21-25. This summarised topology can be used by the P-PCE to plan a route across the multi-domain network. An example summarised topology stored by the P-PCE is shown as topology 32. The effect of the summarisation can be seen by comparing the summarised topology 32 with the actual topology of domains 11-15. For example, some nodes of the actual topology are omitted from the summarised topology 32, such as nodes E, I, H from domain 12, node W from domain 13 and nodes Q, R, V, U from domain 14.

Each domain 11-15 will comprise a topology of network nodes and communication resources connecting nodes. The topology may, for example, be a mesh, ring, or any other topology. Summarisation is a way of forming a summarised representation of a domain. The terms "abstraction" and "virtualisation" are also used as alternatives to summarisation. For example, summarisation can use a simplified topology of edge nodes with interconnected links that represent the correspondent nodes and links between each edge nodes. The summarised topology is a simplified topology that is advertised to other domains. The actual topology is usually more complex.

To illustrate summarisation, FIG. 2A shows two interconnected domains 50, 60 and FIG. 2B shows the summarised representations of the same domains. In FIG. 2A, the actual topology of each domain comprises nodes 51 which interface with other domains and an intra-domain topology of internal nodes 52 and communication links 53 which connect the nodes 51, 52. In FIG. 2B, the internal nodes 52 and links 53 are replaced by a mesh of virtual links 54 between a set of border nodes 51. Each of the links 53 in the domain of FIG. 2A has parameter values which define the capacity and/or performance of the link, such as in terms of bandwidth and delay. In the summarised topology of FIG. 2B, each of the virtual links 54 has parameter values which are based on the parameter values of the actual links 53. The term "virtual link" is used to describe a direct link between border nodes 51 in the summarised topology because a direct link with those parameters often will not exist between the pair of border nodes. Rather, the virtual link represents an indirect path, or a combination of paths between the border nodes in the actual topology of the domain.

In order to route P2MP services, P-PCE 31 has the capability to compute an end-to-end (E2E) path tree across the network 5. To assist with computation of that tree for P2MP services, two new attributes are sent from the C-PCE 21-25 of a domain: P2MP domain capability and Branch point Capability Node. Each C-PCE 21-25 can send these attributes to the P-PCE 31 over communication interface 35.

The summarised topology 32 at the P-PCE can comprise service parameters for the summarised topology such as peak bandwidth, guaranteed bandwidth, delay, jitter, service type (packet, Ethernet, . . . ) etc. A request for a P2MP service can specify service parameters (e.g. peak and guaranteed bandwidth, delay, service type) and the service parameters of the summarised topology 32 held at the P-PCE 31 can be used when computing the E2E P2MP path to determine a path which meets the specified service parameters.

P2MP domain capability means the domain is able to handle a P2MP connection internally to the controlled domain. Handling of P2MP paths requires additional features in the control system adopted in the domain (such as MPLS, GMPLS) and computational level. A P2MP capable domain has a C-PCE which supports these additional features (such as protocol extensions and computation algorithms) to setup and compute a P2MP path within the domain. For example, a C-PCE which is P2MP capable is able to compute using P2MP tree computation algorithms, and has a control plane supporting specific extensions required for setting up/tearing down P2MP paths.

A P2MP path comprises segments (sections) delimited by points where the traffic is duplicated (branch points). Each segment can be managed as a P2P path. The branch point requires specific extensions to system control and on nodes. For example, in the case of a RSVP signalling session there are some extensions that allow to split the session along multiple adjacent nodes.

A node which is a Branch point Capability Node in a P2MP topology represents the point where a service can be forwarded in different directions. A branch point is a node of a domain which is able to duplicate a flow in multiple paths (i.e. a branch point in the P2MP tree). When a C-PCE notifies that a border node is branch capable, it does not necessarily mean that the border node is a branch node. The actual branch node can be internal to the topology of the domain and not "visible" to the P-PCE due to the summarisation of the domain's topology. The branch point notification in this context is relating to the reachability of a branch node, i.e. it means that the border node can reach a branch node. In the example of FIG. 1, the C-PCE, 24, of domain 14 (Metro Ring 2) can notify the P-PCE 31 that node P is a branch point. The actual branch points are internal to the topology of the domain, at nodes Q and R.

If PCEP is used as the communication protocol between C-PCE and P-PCE, then one possible way for signalling P2MP domain capability and Branch point Capability Node is by using elements described in RFC 6006. Note that RFC 6006 concerns PCEP communication to/from a PCE of a single domain for computation of P2MP paths. RFC 6006 does not consider a multi-domain scenario. In RFC 6006, the information exchanged with a PCE is of the actual topology. In embodiments of the present invention, elements of RFC 6006 can be re-used for communication between a C-PCE and a P-PCE. The information sent from a C-PCE to a P-PCE relate to a summarised (virtualised) topology of the domain, rather than the actual topology of the domain.

P2MP domain capability can be signalled using the P2MP flag in the Request Parameters (RP) object described at chapter 3.7 of RFC 6006. A procedure for exchanging this attribute is described in RFC 6006. Specifically, a Type-Length-Value (TLV) called "PCEP TLV Type Indicators" is defined at section 6.1 of RFC 6006. Each C-PCE that is able to handle a P2MP connection and wants to notify this capability to P-PCE, inserts this TLV in the "OPEN" message sent during establishment of PCEP session between the P-PCE and the C-PCE. In the example network of FIG. 1, the P2MP capable domains are the ones that notify the branch points, i.e. domains 14 and 15. Typically, a domain is required to be P2MP capable to declare a branch point. "P2MP capability" declares that the domain supports P2MP features (system control and nodes); the branch point declares which nodes in the summarised domain topology can act as a branch point. It is possible that a subset of nodes within the summarised domain topology do not have branch point capability.

P2MP domain capability and "Branch point Capability Node" are generally linked. The first indicates that a domain is able to support P2MP services, while the second indicates which summarised nodes (if any) of a domain can act as a branch point.

It is possible that a domain is P2MP capable but does not have one or more nodes which are branch point capable nodes. Although the domain cannot support branching of P2MP paths, the domain can support other P2MP features, such as duplicate signalling sessions of P2MP paths. A P2MP path is formed of multiple segments delimited by branch points. Each segment can be managed internally as a P2P path. A domain which is not P2MP capable can be involved in a P2MP path as an internal segment of an overall P2MP path segment. Referring to the example of FIG. 3, the P2MP path comprises four segments: A-S; S-X; S-Y; S-Z. Domain 13 is not P2MP capable but can participate in a P2MP session, as it is an internal segment of segment A-S.

Branch point Capability Node can be described by the Type-Length-Value (TLV) Branch Node Capability (BNC) Object defined in RFC 6006 at section 3.11.1 and section 6.5, with some changes due to the applicability in the Hierarchical PCE architecture. One change is that exchange of the information occurs in a Notify PCEP message, when the summarised topology is reported by a C-PCE to a P-PCE. Another change is that it is reported as a router attribute of the border node exchanged by the PCEP protocol.

In an embodiment, this object can be used when each C-PCE 21-25 notifies domain connectivity to the P-PCE 31.

A number of use cases will now be described.

Use Case 1: Startup

FIG. 1 shows the deployment of startup phase. The following steps are performed:

Each C-PCE, 21-25, sends information to the P-PCE 31 about:
(i) inter-domain links and nodes that interconnect the controlled domains with the neighbouring ones (border nodes);
(ii) summarised links and nodes. This information also comprises information about: P2MP domain capability; branch node capability. The summarised links and nodes can be sent via PCEP compliant to IETF standard, such as RFC 5440 and RFC 6805.

The P-PCE 31 forms a summarised topology 32 of the multi-domain network. The P-PCE 31 is now ready to route services across the multi-domain network.

Use Case 2: Setup/Teardown

Figure 3:
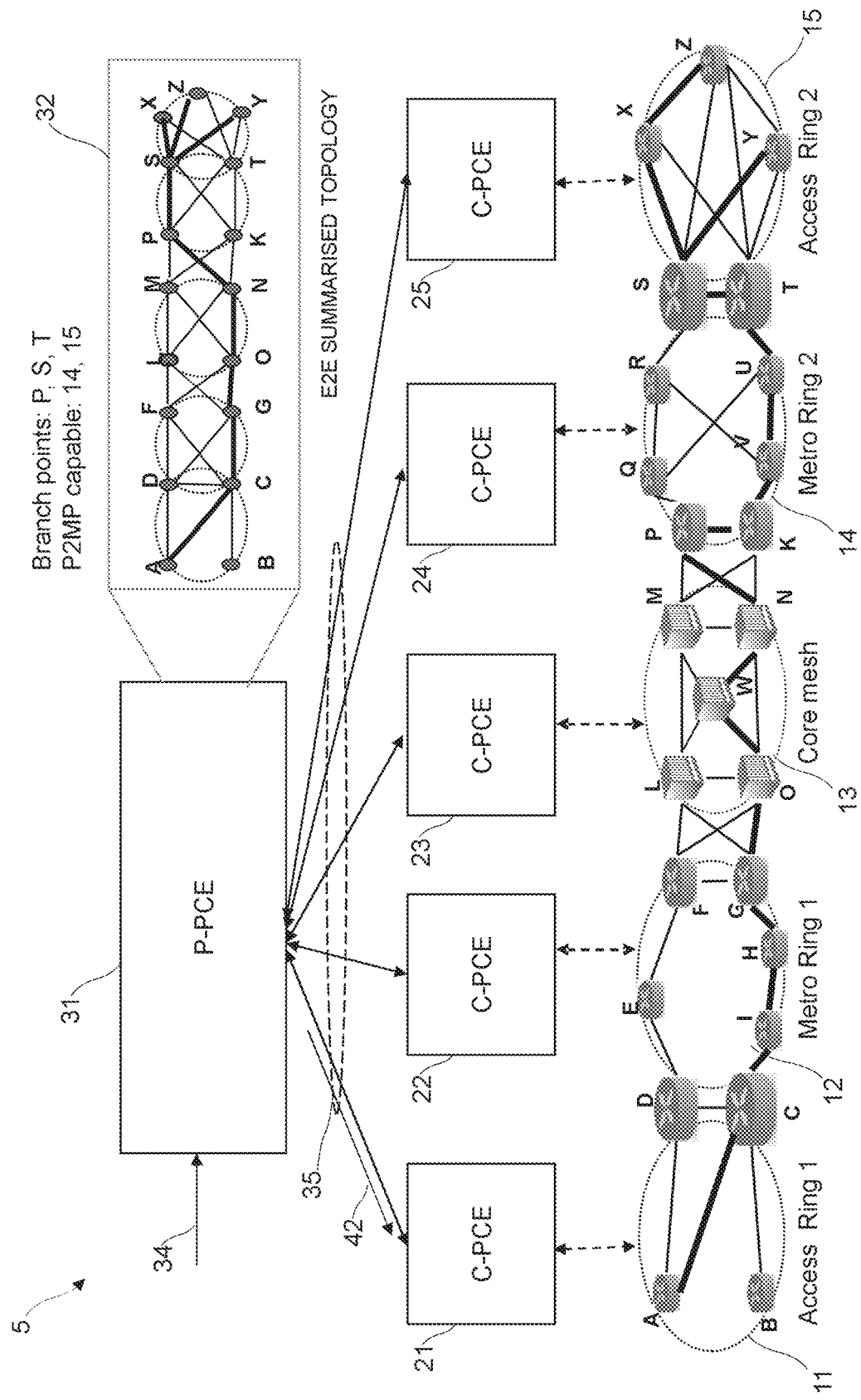
FIG. 3 shows set up of a P2MP service across the multi-domain network of FIG. 1.

FIG. 3 shows the setup phase of a path (connection, service) across the network 5. Setup is triggered when a setup request of a service is received 34 by the P-PCE 31. The request may be sent by the ingress node of the new connection, or directly received without involvement of other nodes. Each service request has a unique identifier called a service ID. The following steps are performed at service setup:

P-PCE 31 computes an end-to-end tree for the new service. The P-PCE can use a P2MP shortest paths algorithm (e.g. a Steiner tree) using the summarised topology 32 which was determined during the startup phase. The computation of the P2MP tree makes use of the information about which domains. The computation of the P2MP tree makes use of the information about which domains have branch point capability. FIG. 3 shows a computed path A-C-G-O-N-P-S. The branch point is at node S. Node S is connected to nodes X, Y and Z.

After the computation of the tree, the P-PCE returns a Resource Reservation Protocol TE (RSVP-TE) explicit route object (ERO) based on the Path Key mechanism, such as described in RFC 5520.

P-PCE 31 contacts each C-PCE involved in the computed path tree. In this example, all of the domains 11-15 are involved in the computed path, so each C-PCE 21-25 is contacted. The P-PCE 31 contacts each C-PCE 21-25 via interface 35.

Each involved C-PCE is responsible to establish a path within the respective domain, according to the control mechanism used within that domain. The establishment can be P2MP, if C-PCE has notified the P-PCE that the domain is P2MP capable. The P-PCE can request the domain to perform a branch in the E2E tree path, if the C-PCE has indicated that the domain is P2MP branch point capable.

The established path within each involved domain and the associated service ID can be stored in a database internal to C-PCE (stateful C-PCE) or in an external application.

After the intra-domain paths are successfully setup, the interconnection of intra-domain paths is performed by the P-PCE 31 according to the E2E control mechanism used.

P-PCE 31 stores the E2E tree and the associated service ID internally (stateful P-PCE) or in an external application.

In the above example the branch point of the P2MP path tree occurs at border node S. It is possible, in other examples, that a branch point can occur internally to a domain. Consider again the example of domain 14 with a border node P and branch capability at internal nodes Q and R. Border node P of the summarised topology is advertised as having branch point capability. If the P-PCE requests C-PCE 24 of domain 14 sets up a P2MP service with a branch point at node P, the actual branch point for the path set up by C-PCE 24 will perform a branch point at node Q or node R.

Teardown is triggered when a teardown request of a previously established service (identified by a service ID) is received by the P-PCE 31. The request may be sent by the ingress node of the service, or it may be directly received without other involvement of other nodes. The following steps are performed:
- P-PCE 31 retrieves the computed tree paths from a database (e.g. from an internal database or via a query to an external application).
- P-PCE 31 retrieves the ERO based on Path Key mechanism.
- P-PCE contacts each C-PCE involved in the path by sending a path teardown request. If the full service of FIG. 3 is torn down, then the P-PCE 31 contacts the C-PCEs 21-25.
- Each involved C-PCE retrieves the path selected for the service. The C-PCE is responsible for teardown of the path within that domain.
- The interconnection of intra-domain paths is torn down.

Use Case 3: Intra-Domain Recovery

This phase is triggered when a domain detects an internal fault (intra-domain fault). This event can be notified to the C-PCE where the fault occurs according to an intra-domain mechanism such as RSVP notify, proprietary alarm notification, or any other suitable mechanism.

The C-PCE attempts to provide an alternative path (P2P or P2MP). In a case where the failure cannot be recovered within the domain, the fault event is notified to P-PCE 31 and an inter-domain recovery mechanism is triggered.

Use Case 4: Inter-Domain Recovery

This phase can be triggered when an intra-domain fault cannot be recovered within the domain, or when a fault on an inter-domain link is detected (i.e. an inter-domain fault).

This event is notified to P-PCE 31. Notification can be made via a PCEP Path request reporting the fault link as a routing constraint or via a management protocol ("controlled based" architecture).

The P-PCE 31 can recover the service in two ways according the internal policy:
- E2E Recovery: P-PCE recovers the entire tree path by computing a new tree disjoint from the old tree.
- Local Recovery: P-PCE recovers a segment of the tree path by finding a new local disjoint segment.

E2E Recovery requires the teardown and setup of the entire tree. Setup and teardown is performed as defined in use case 2. A make-before-break mechanism is recommended if the source node and destination nodes allows, as this will preserve traffic.

Local Recovery requires the teardown and setup of the segment recomputed. Setup and teardown is performed as described in use case 2, but the procedure is only applied to a subset of C-PCEs involved in the recovered segment of the tree. A make-before-break mechanism is recommended if the source node and destination nodes allows, as this will preserve traffic.

Use Case 5: Dynamic P2MP Service Change

Figure 4:
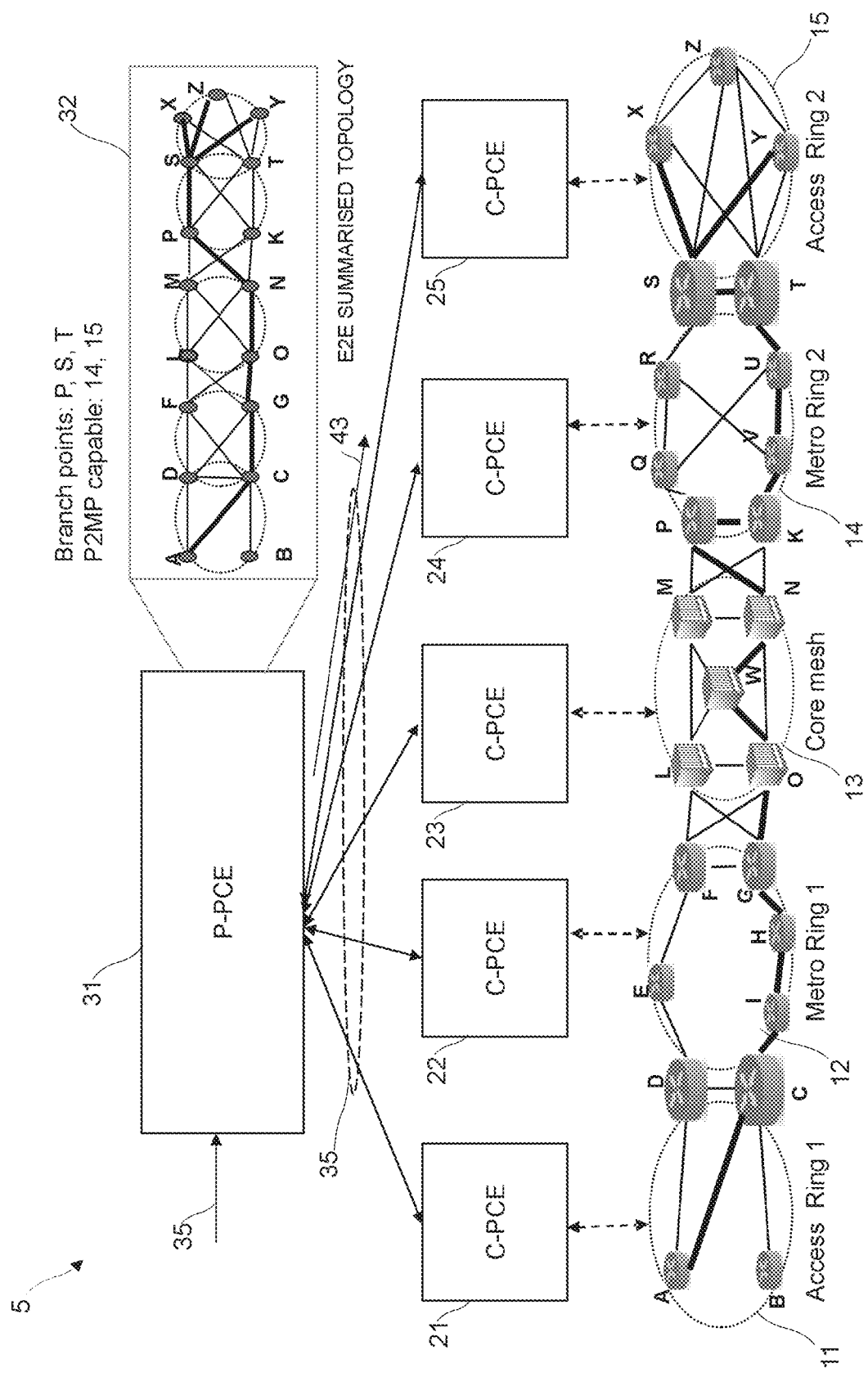
FIG. 4 shows a change to the P2MP service across the multi-domain network of FIG. 1.

This use case is represented in FIG. 4. A P2MP service can change dynamically during its life cycle. For example, it is possible that one or more of the destination nodes of the service can change. This requires joining additional destination nodes to the existing service, or detaching destination nodes from the service.

This phase is triggered when a service modification request 35 is received by the P-PCE 31. The service modification request may be received from a node such as the source node, or may be received from another entity such as a network management system. The modification can be performed in various ways, according to internal policy:
- E2E Modification. A new path is computed
- Local Modification. A segment of the path tree is modified. For example, by removing/adding a leaf in the path tree.

E2E Modification requires the teardown and setup of the entire tree. Setup and teardown is done as defined in use case 2. A make-before-break mechanism is recommended if the source node and destination nodes allows, as this will preserve traffic.

Local Modification requires the teardown/setup of the modified segment. Setup and teardown is performed as described in use case 2, but the procedure is only applied to a subset of C-PCEs involved in the recovered segment of the tree. A make-before-break mechanism is recommended if the source node and destination nodes allows, as this will preserve traffic.

Figure 5:
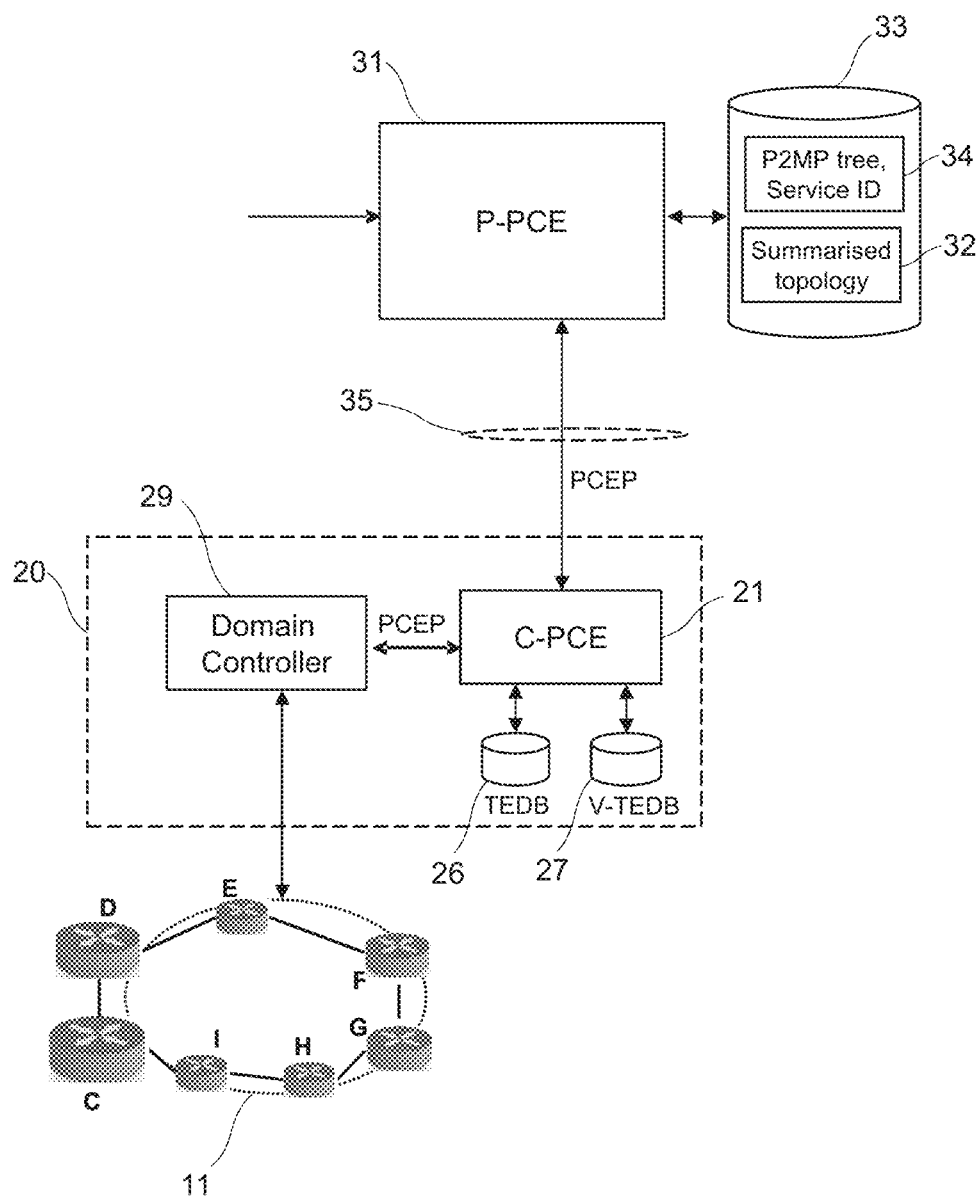
FIG. 5 shows apparatus at a per-domain and P-PCE level in more detail.

FIG. 5 shows further detail of apparatus provided at a per-domain level, and a P-PCE level. The Child PCE (C-PCE) 21 is communicatively connected to a Traffic Engineering Database (TEDB) 26, which is a physical domain database of an actual topology of the domain. The Child PCE (C-PCE) creates a virtual Traffic Engineering Database (V-TEDB) 27, which is a virtual or summarised topology of the domain topology of the TEDB 26. The V-TEDB 27 can be shared with the P-PCE 31.

A controller 29 is responsible for setting up/tearing down paths computed by a PCE. This can be an intra-domain path computed by the C-PCE 21 or an inter-domain path computed by the P-PCE 31. The controller 29 can also be responsible for managing alarms, such as link failure alarms. Functionality of a controller and C-PCE can be divided in the manner shown in FIG. 5 as the functionality of a controller is often provided by the vendor of the domain. Examples of controllers are a Network Management System (NMS) and control planes such as Generalised Multi-Protocol Label Switching (GMPLS) or Multi-Protocol Label Switching (MPLS).

The P-PCE is communicatively connected to a storage medium 33. Data stored in the storage medium 33 comprises a summarised topology 32 of the multi-domain network, based on information received from C-PCEs 21-25. Data stored in the storage medium 33 comprises the information sent from each C-PCE of whether a domain is P2MP capable and if a domain has Branch point Capability Node. Data stored in the storage medium 33 comprises a P2MP tree computed for a P2MP service using the summarised topology. The P2MP service can be indexed by a service ID.

Figure 6:
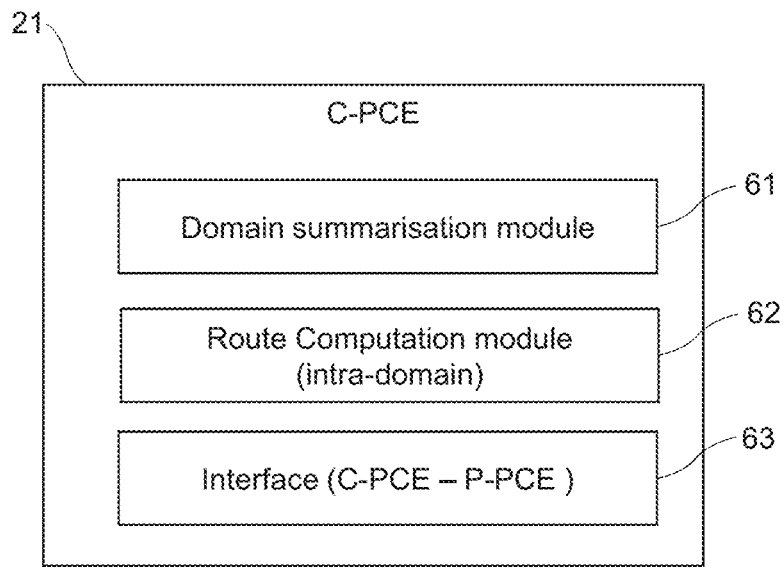
FIG. 6 shows a C-PCE in more detail.

FIG. 6 shows functional modules of one of the Child Path Computation Elements (C-PCE) 21-25. The C-PCE 21 comprises a domain summarisation module 61 arranged to determine summarised topology domain information about the domain. The C-PCE 21 also comprises a route computation module 62 for computing an intra-domain route. The route computation module 62 can compute an intra-domain route in response to a request from a P-PCE 31. The C-PCE 21 also comprises an interface 63 for sending the summarised domain topology information to a Parent Path Computation Element, P-PCE.

Figure 7:
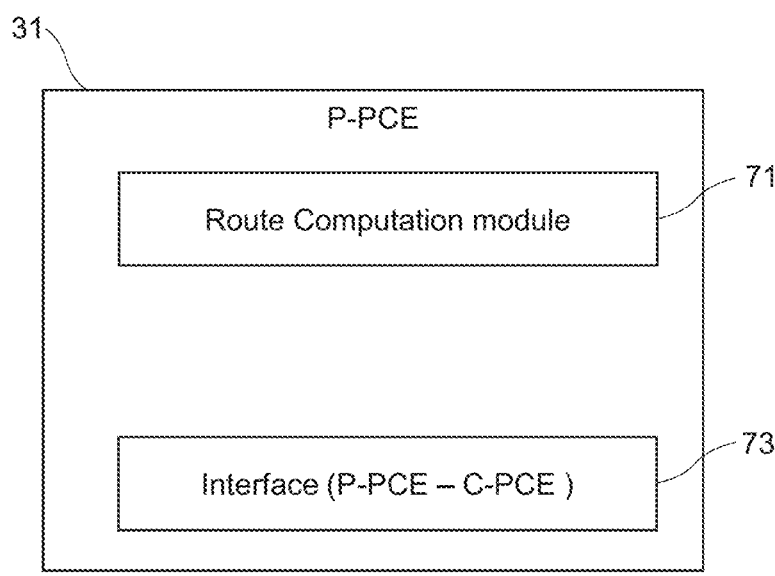
FIG. 7 shows a P-PCE in more detail.

FIG. 7 shows functional modules of the Parent Path Computation Element (P-PCE) 31. The P-PCE 31 comprises a route computation module 71 arranged to compute an end-to-end Point-to-Multi-Point tree using a topology based on the summarised domain topology information received from the Child Path Computation Elements. The P-PCE 31 also comprises an interface 73 for receiving summarised domain topology information from Child Path Computation Elements.

Figure 8:
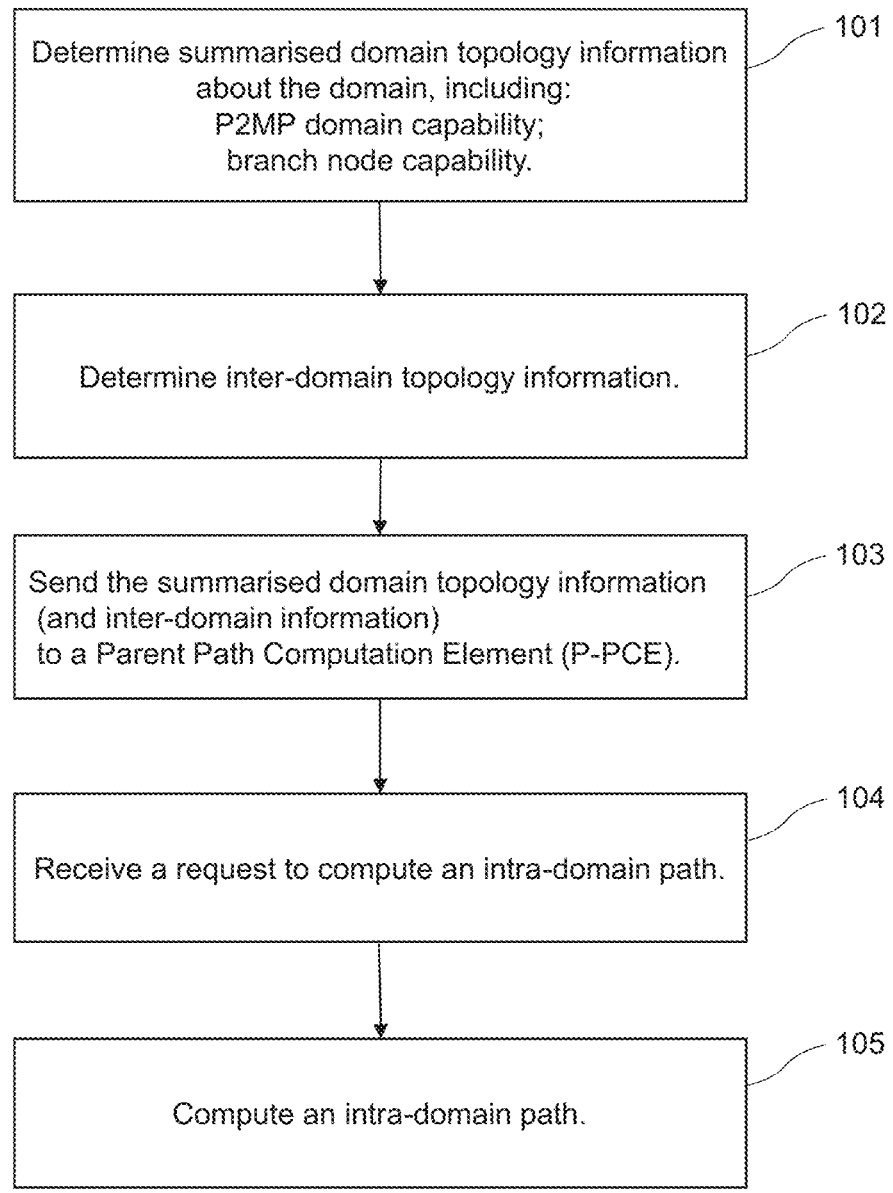
FIG. 8 shows a method performed at a C-PCE of the multi-domain network.

FIG. 8 shows a method performed at one of the C-PCEs 21-25. Step 101 determines summarised domain topology information about the domain. The summarised domain topology information comprises at least one of: an indication of whether the domain is capable of supporting Point-to-Multi-Point services; an indication of whether the domain is capable of supporting a branch point for Point-to-Multi-Point services. Step 102 determines inter-domain connectivity information which indicates if a node of the domain is connected to a node of another domain. Step 103 sends the summarised domain topology information (and the inter-domain connectivity information) to a P-PCE. Step 104 receives a request from the P-PCE to compute an intra-domain path. Step 105 computes an intra-domain path.

Figure 9:
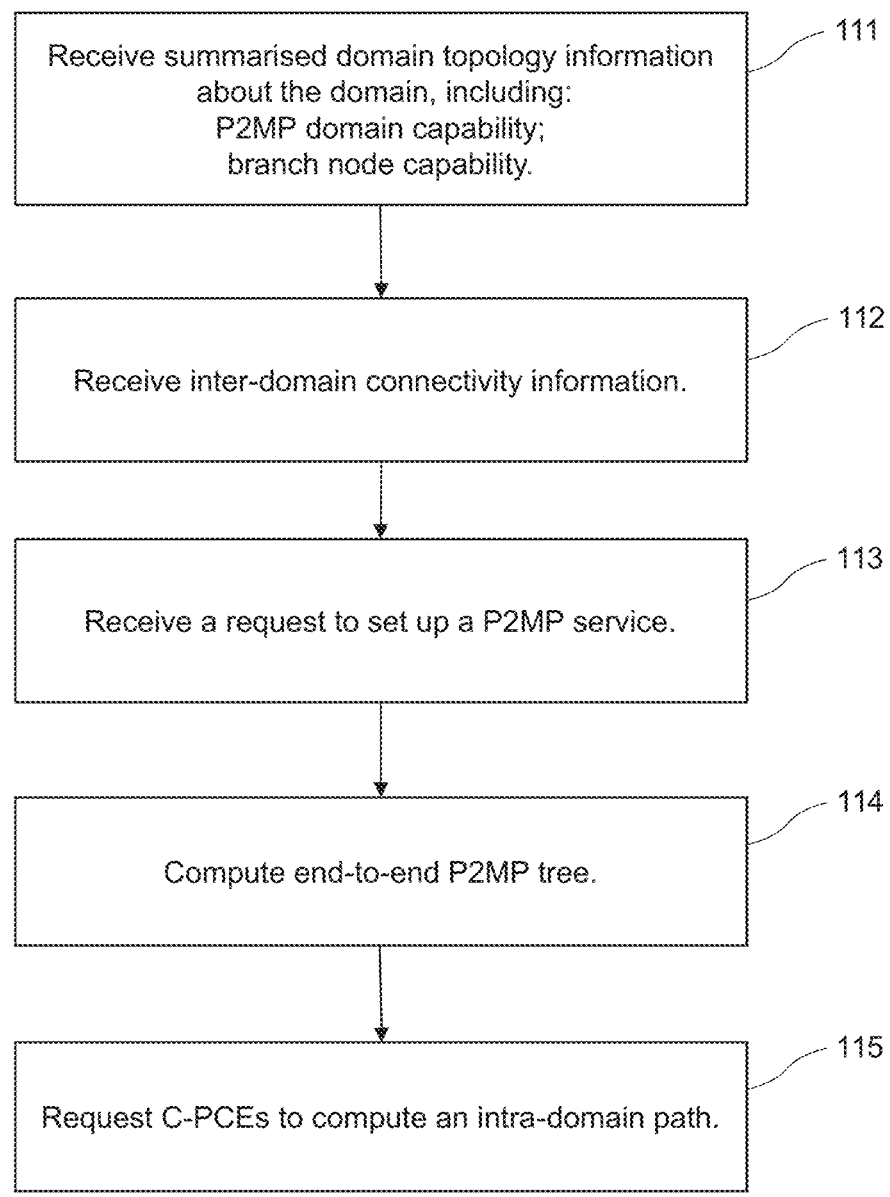
FIG. 9 shows a method performed at a P-PCE of the multi-domain network.

FIG. 9 shows a method performed at the P-PCE 31. Step 111 receives summarised domain topology information comprising at least one of: an indication of whether the domain is capable of supporting Point-to-Multi-Point services; an indication of whether the domain is capable of supporting a branch point for Point-to-Multi-Point services. Step 112 receives inter-domain connectivity information which indicates which nodes of domains are connected to nodes of other domains. At step 113 a request is received to set up a Point-to-Multipoint service between domains. Step 114 computes an end-to-end Point-to-Multi-Point tree using a topology based on the summarised domain topology information received from the Child Path Computation Elements. At step 115 the P-PCE requests each Child Path Computation Element of a domain in the computed end-to-end Point-to-Multi-Point tree to compute an intra-domain path.

Figure 10:
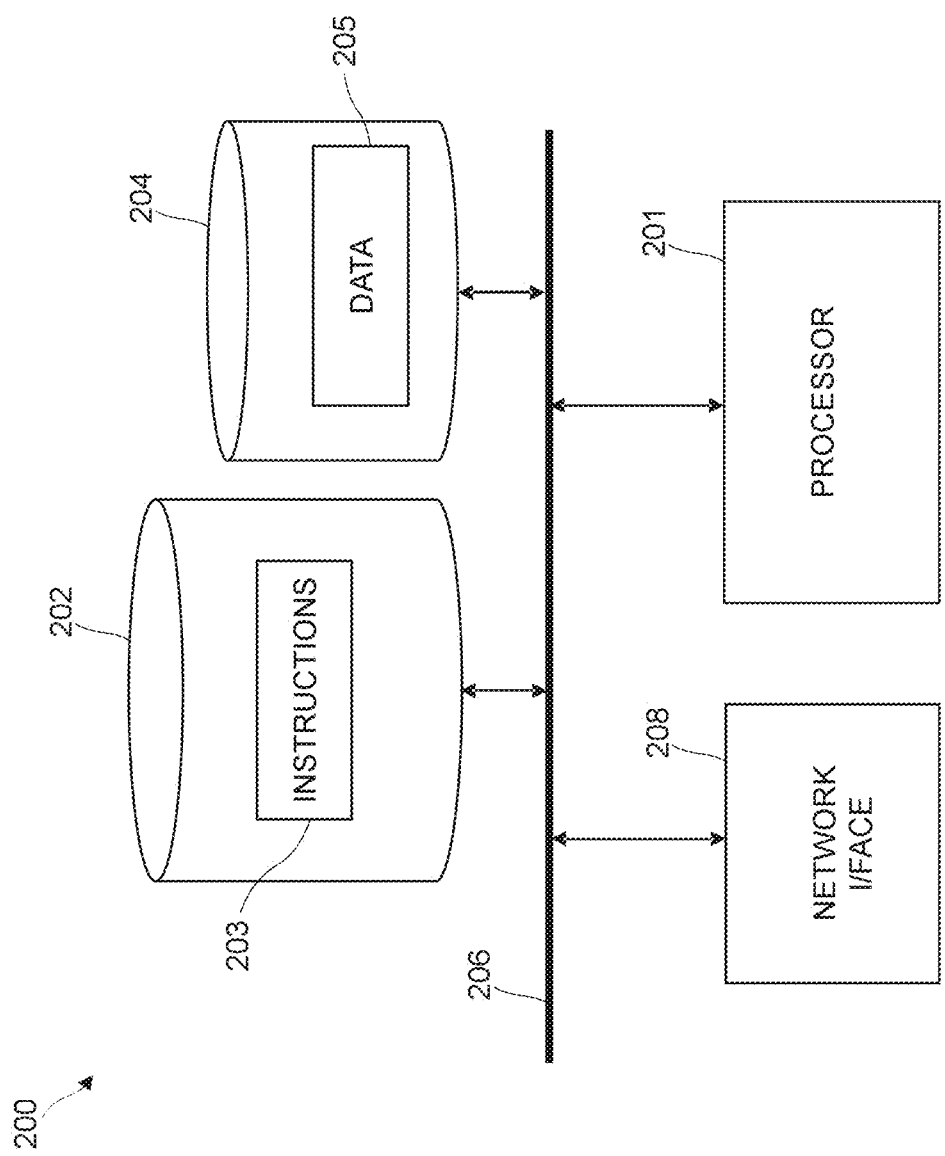
FIG. 10 shows processing apparatus for implementing an element of the network.

FIG. 10 shows an example processing apparatus 200 which may be implemented as any form of a computing and/or electronic device, and in which embodiments of the system and methods described above may be implemented. Processing apparatus 200 can be provided at one of the C-PCEs 21-25, or at the P-PCE 31. Processing apparatus 200 may implement the method shown in FIG. 8 or 9. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other network entities, such as other nodes of the network 5.

Depending on implementation in the network the processing apparatus 200 may operate as a C-PCE or as a P-PCE. If implemented as a C-PCE the instructions 203 stored in the memory 202 are instructions for executing the method of a C-PCE. Similarly, if implemented as a P-PCE the instructions 203 stored in the memory 202 are instructions for executing the method of a P-PCE.

An advantage of an embodiment is easier handling/management of P2MP connections. P-PCE performs computation on an equivalent simplified inter-domain network topology. Handling/management of P2MP services is distributed across a larger number of C-PCEs.

An advantage of an embodiment can be an avoidance of the need to introduce additional and/or proprietary extensions to carry information for use in routing P2MP services.

An advantage of an embodiment is preserving confidentiality between domains. A domain can select what information it wants to share with a P-PCE and can preserve the confidentiality of the internal topology of the domain.

An advantage of an embodiment is that a P-PCE can compute a path across multiple domains which is better suited to the needs of the service and the resources of the domains. For example, the route selected by the P-PCE may not necessarily be the route which crosses the minimum number of domains, as that is not always the best solution.

An advantage of using an H-PCE architecture is improved scalability and routing efficiency.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for use in routing Point-to-Multi-Point (P2MP) services in a multi-domain network with a Hierarchical Path Computation Element (H-PCE) architecture, the method comprising a Child Path Computation Element (C-PCE) of one of the domains:
   determining summarized domain topology information about the domain, the summarized domain topology information comprising
      an indication of whether a node of the summarized domain topology is capable of supporting a branch point for Point-to-Multi-Point services; and
   sending the summarized domain topology information to a Parent Path Computation Element (P-PCE).

2. The method of claim 1, further comprising the C-PCE:
   determining inter-domain connectivity information which indicates if a node of the domain is connected to a node of another domain; and
   sending the inter-domain connectivity information to the P-PCE.

3. The method of claim 1:
wherein the determining comprises determining service parameters of the summarized topology of the domain; further comprising the C-PCE sending the service parameters to the P-PCE.

4. The method of claim 1, wherein the sending the summarized domain topology information uses at least one Path Computation Element Protocol message.

5. The method of claim 4, wherein the summarized domain typology information further comprises an indicator of whether the domain is capable of supporting Point-to-Multi-Point services, the indicator comprises a Path Computation Element Protocol Type-Length-Value Type indicator.

6. The method of claim 4, wherein the indication of whether a node of the summarized domain topology is capable of supporting a branch point for Point-to-Multi-Point services comprises a Branch Node Capability object of a Path Computation Element Protocol message.

7. The method of claim 1, further comprising the C-PCE:
receiving a request, from the P-PCE, to compute an intra-domain path;
computing an intra-domain path.

8. A method for use in routing Point-to-Multi-Point (P2MP) services in a multi-domain network with a Hierarchical Path Computation Element (H-PCE) architecture, the method comprising a Parent Path Computation Element (P-PCE) of the domains:
receiving summarized domain topology information from a Child Path Computation Element (C-PCE) of one of the domains, the summarized domain topology information comprising at least one of:
an indication of whether the domain is capable of supporting Point-to-Multi-Point services; and
an indication of whether a node of the summarized domain topology is capable of supporting a branch point for Point-to-Multi-Point services; and
computing an end-to-end Point-to-Multi-Point tree using a topology based on the summarized domain topology information received from the C-PCEs.

9. The method of claim 8, further comprising receiving at least one of:
inter-domain connectivity information which indicates if a node of a domain is connected to a node of another domain; and
service parameters of the summarized topology of the domain.

10. The method of claim 8, further comprising:
receiving a request to set up a Point-to-Multipoint service between domains;
computing the end to end Point to Multipoint tree responsive to the request, wherein the end-to-end tree comprises a plurality of the domains; and
requesting Child Path Computation Elements of domains in the computed end-to-end Point-to-Multi-Point tree to compute an intra-domain path.

11. The method of claim 10, wherein the requesting comprises requesting a Child Path Computation Element of a domain in the computed end-to-end tree to perform a branch point for the Point-to-Multipoint tree.

12. The method according to claim 8, wherein the summarized domain topology information is received in at least one Path Computation Element Protocol message.

13. The method of claim 12, wherein the indication of whether the domain is capable of supporting Point-to-Multi-Point services comprises a Path Computation Element Protocol Type-Length-Value Type indicator.

14. The method of claim 12, wherein the indication of whether a node of the summarized domain topology is capable of supporting a branch point for Point-to-Multi-Point services comprises a Branch Node Capability object of a Path Computation Element Protocol message.

15. A Child Path Computation Element (C-PCE) for a domain of a multi-domain network with a Hierarchical Path Computation Element (H-PCE) architecture, the C-PCE comprising:
one or more processing circuits configured to function as a domain summarization circuit configured to determine summarized topology domain information about the domain, the summarized domain topology information comprising
an indication of whether a node of the summarized domain topology is capable of supporting a branch point for Point-to-Multi-Point services; and,
an interface configured to send the summarized domain topology information to a Parent Path Computation Element (P-PCE).

16. A Parent Path Computation Element (P-PCE) for a domain of a multi-domain network with a Hierarchical Path Computation Element (H-PCE) architecture, the P-PCE comprising:
an interface configured to receive summarized domain topology information from Child Path Computation Elements (C-PCE) of the domains, wherein the summarized domain topology information comprises at least one of:
an indication of whether the domain is capable of supporting Point-to-Multi-Point services; and
an indication of whether a node of the summarized domain topology is capable of supporting a branch point for Point-to-Multi-Point services; and
one or more processors configured to function as a route computation circuit configured to compute an end-to-end Point-to-Multi-Point tree using a topology based on the summarized domain topology information received from the C-PCEs.

17. The P-PCE of claim 16, wherein the one or more processing circuits are further configured to request, via the interface, C-PCEs of domains in the computed end-to-end Point-to-Multi-Point tree to compute an intra-domain path.

18. A network comprising:
a plurality of domains;
a Hierarchical Path Computation Element, (H-PCE) architecture, comprising:
a Parent Path Computation Element, P-PCE comprising:
an interface configured to receive summarized domain topology information from Child Path Computation Elements (C-PCE) of the domains, wherein the summarized domain topology information comprises at least one of:
an indication of whether the domain is capable of supporting Point-to-Multi-Point services; and
an indication of whether a node of the summarized domain topology is capable of supporting a branch point for Point-to-Multi-Point services; and
one or more processors configured to function as a route computation circuit configured to compute an end-to-end Point-to-Multi-Point tree using a topology based on the summarized domain topology information received from the C-PCEs;
a C-PCE associated with each of the domains, the C-PCE comprising:

one or more processing circuits configured to function as a domain summarization circuit configured to determine the summarized topology domain information about the domain; and an interface configured to send the summarized domain topology information to the P-PCE.

19. A Child Path Computation Element (C-PCE) for a domain of a multi-domain network with a Hierarchical Path Computation Element (H-PCE) architecture, the C-PCE comprising:

a processor and a memory;

wherein the memory contains instructions executable by the processor whereby the C-PCE is operative to:

determine summarized topology domain information about the domain, the summarized domain topology information comprising an indication of whether a node of the summarized domain topology is capable of supporting a branch point for Point-to-Multi-Point services; and send the summarized domain topology information to a Parent Path Computation Element (P-PCE).

20. A Parent Path Computation Element (P-PCE) for a domain of a multi-domain network with a Hierarchical Path Computation Element (H-PCE) architecture, the P-PCE comprising:

a processor and a memory;

wherein the memory contains instructions executable by the processor whereby the P-PCE is operative to:

receive summarized domain topology information from Child Path Computation Elements (C-PCE) of the domains, wherein the summarized domain topology information comprises at least one of:

an indication of whether the domain is capable of supporting Point-to-Multi-Point services;

an indication of whether a node of the summarized domain topology is capable of supporting a branch point for Point-to-Multi-Point services; and compute an end-to-end Point-to-Multi-Point tree using a topology based on the summarized domain topology information received from the C-CPEs.

21. A computer program product stored in a non-transitory computer readable medium for routing Point-to-Multi-Point (P2MP) services in a multi-domain network with a Hierarchical Path Computation Element (H-PCE) architecture, the computer program product comprising software instructions which, when run on one or more processing circuits of a Parent Path Computation Element (P-PCE) of the domains, causes the P-CPE to:

receive summarized domain topology information from a Child Path Computation Element (C-PCE) of one of the domains, the summarized domain topology information comprising at least one of:

an indication of whether the domain is capable of supporting Point-to-Multi-Point services; and an indication of whether a node of the summarized domain topology is capable of supporting a branch point for Point-to-Multi-Point services; and compute an end-to-end Point-to-Multi-Point tree using a topology based on the summarized domain topology information received from the C-PCEs.

22. A computer program product stored in a non-transitory computer readable medium for routing Point-to-Multi-Point (P2MP) services in a multi-domain network with a Hierarchical Path Computation Element (H-PCE) architecture, the computer program product comprising software instructions which, when run on one or more processing circuits of a Child Path Computation Element (C-PCE) of one of the domains, causes the C-CPE to:

determine summarized domain topology information about the domain, the summarized domain topology information comprising an indication of whether a node of the summarized domain topology is capable of supporting a branch point for Point-to-Multi-Point services; and send the summarized domain topology information to a Parent Path Computation Element (P-PCE).

* * * * *